(No Model.)
D. L. MILLER.
RUB IRON.
No. 544,989. Patented Aug. 20, 1895.
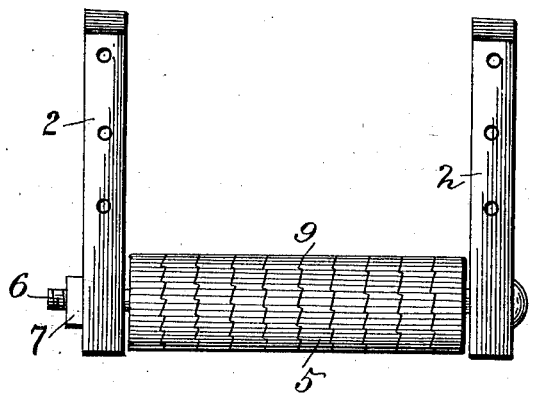
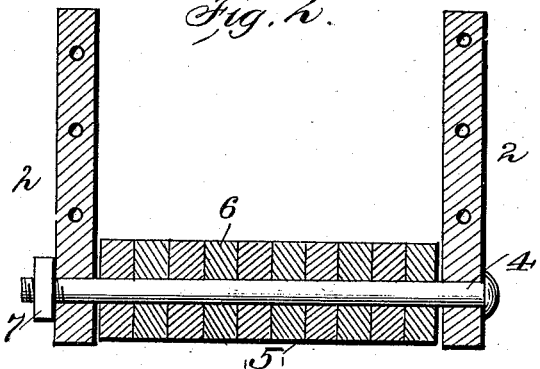
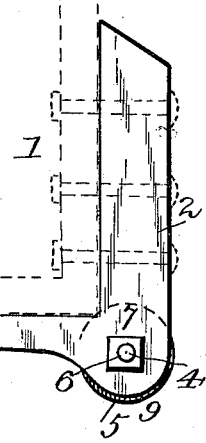
WITNESSES
F. L. Ourand
A. B. Suit
INVENTOR
David L. Miller
By H. B. Wellsey
Attorney

UNITED STATES PATENT OFFICE.

DAVID L. MILLER, OF WILSON, KANSAS.

RUB-IRON.

SPECIFICATION forming part of Letters Patent No. 544,989, dated August 20, 1895.

Application filed May 9, 1895. Serial No. 548,706. (No model.)

*To all whom it may concern:*

Be it known that I, DAVID L. MILLER, a citizen of the United States, residing at Wilson, in the county of Ellsworth and State of Kansas, have invented certain new and useful Improvements in Rub-Irons; and I do declare the following to be a full, clear, and exact description of the invention, such as will enable others skilled in the art to which it appertains to make and use the same.

My invention relates to rub-irons for vehicles, and more especially to that class of devices in which a roller is employed to prevent the wheel chafing the body and to allow the vehicle to be easily turned short without materially increasing the draft on the horse.

The object of the invention is to simplify the construction and to provide a device which may be produced at a small cost and which will be well adapted for the purpose for which it is designed.

With these objects in view the invention consists of certain features of construction and combination of parts, which will be hereinafter fully described and claimed.

In the accompanying drawings, Figure 1 is a side elevation of my improved rub-iron. Fig. 2 is a longitudinal sectional view. Fig. 3 is an end view.

In the drawings, 1 denotes brackets, each of which comprises a vertical portion 2 and a horizontal portion 3, at the intersection of which is formed bearing-apertures 4. These brackets are secured to the sides of a vehicle by the vertical portions 2 and to the under side of the floor by the horizontal portions 3. A roller 5 is journaled between these brackets by a bolt 6, having at one end a nut 7, so as to receive the wheel when the vehicle is turned short and act as a rolling bearing, thus reducing friction to a minimum and relieving the horse of undue strain in turning.

It is a well-known fact that the edge of the tire of the wheel is brought against the roller in turning short and that in a short period the roller will be grooved or cut entirely through, thus rendering it useless. To overcome this objection, I form the roller of a series of collars 8, whereby when one collar has become worn it may be moved to one side and another collar moved in its place to be engaged by the wheel. To prevent a disagreeable rattling sound, I lock these collars together, preferably by providing the ends of the collars with interlocking teeth or projections 9, so that the collars will all rotate together. A roller thus constructed is very simple and will be found to last much longer than a roller made in one piece, for reasons above mentioned.

Having thus described my invention, what I claim, and desire to secure by Letters Patent, is—

A rub iron consisting of a bracket, a roller formed of a series of collars having intermeshing teeth at their ends, a bolt for journaling the collar to the bracket, and a nut for holding the bolt in place, substantially as set forth.

In testimony whereof I affix my signature in presence of two witnesses.

DAVID L. MILLER.

Witnesses:
  W. H. DELLINGER,
  J. S. DELLINGER.